(12) United States Patent
Kovacs et al.

(10) Patent No.: US 11,757,128 B2
(45) Date of Patent: Sep. 12, 2023

(54) ELECTROCHEMICAL CELLS FOR HIGH-ENERGY BATTERY USE

(71) Applicant: Broadbit Batteries OY, Espoo (FI)

(72) Inventors: Andras Kovacs, Espoo (FI); David Lloyd, Espoo (FI); David Paul Brown, Helsinki (FI)

(73) Assignee: BROADBIT BATTERIES OY, Espoo (FI)

( * ) Notice: Subject to any disclaimer, the term of this patent is extended or adjusted under 35 U.S.C. 154(b) by 0 days.

(21) Appl. No.: 16/636,483

(22) PCT Filed: Aug. 2, 2018

(86) PCT No.: PCT/FI2018/050571
§ 371 (c)(1),
(2) Date: Feb. 4, 2020

(87) PCT Pub. No.: WO2019/025663
PCT Pub. Date: Feb. 7, 2019

(65) Prior Publication Data
US 2020/0251775 A1 Aug. 6, 2020

(30) Foreign Application Priority Data
Aug. 4, 2017 (FI) .................................. 20175712

(51) Int. Cl.
*H01M 4/00* (2006.01)
*H01M 10/0563* (2010.01)
(Continued)

(52) U.S. Cl.
CPC ........ *H01M 10/0563* (2013.01); *H01G 11/32* (2013.01); *H01G 11/52* (2013.01);
(Continued)

(58) Field of Classification Search
CPC ........... H01M 2300/002; H01M 4/663; H01M 10/0525; H01M 10/0563; H01G 11/58; H01G 11/62
See application file for complete search history.

(56) References Cited

U.S. PATENT DOCUMENTS 4,508,798 A    4/1985  Gopikanth et al.
4,515,875 A    5/1985  Bowden et al.
(Continued)

FOREIGN PATENT DOCUMENTS

CN    101779316 A    7/2010
EP    2860811         4/2015
(Continued)

OTHER PUBLICATIONS

Hartl et al., "A Liquid Inorganic Electrolyte Showing an Unusually High Lithium Ion Transference Number: A Concentrated Solution of $LiAlCl_4$ in Sulfur Dioxide", Energies, vol. 6, pp. 4448-4464 (2013).
(Continued)

*Primary Examiner* — Cynthia H Kelly
*Assistant Examiner* — Monique M Wills
(74) *Attorney, Agent, or Firm* — Kilpatrick Townsend & Stockton, LLP

(57) ABSTRACT

Components and structures for a rechargeable electrochemical cell and an electrochemical cell having an S02 solvent based electrolyte comprising any of said components and structures are provided. The cathode (2) may comprise one or more elemental transition metals and/or one or more partially oxidized transition metals. The S02 solvent based electrolyte (3) may comprise halide-containing salt additive as an SEI-forming additive. The anode current collector (5) may comprise a carbon coated metal, an alloy of two or more metals or a carbon coated alloy of two or more metals. The
(Continued)

electrochemical cell may comprise excess non-dissolved/solid alkali halides. The components, structures and cell may bay used in a device.

24 Claims, 4 Drawing Sheets

(51) Int. Cl.

| | |
|---|---|
| *H01G 11/32* | (2013.01) |
| *H01G 11/52* | (2013.01) |
| *H01G 11/60* | (2013.01) |
| *H01G 11/62* | (2013.01) |
| *H01G 11/68* | (2013.01) |
| *H01M 4/136* | (2010.01) |
| *H01M 4/58* | (2010.01) |
| *H01M 4/66* | (2006.01) |
| *H01M 10/0525* | (2010.01) |
| *H01M 10/054* | (2010.01) |

(52) U.S. Cl.
CPC ............ *H01G 11/60* (2013.01); *H01G 11/62* (2013.01); *H01G 11/68* (2013.01); *H01M 4/136* (2013.01); *H01M 4/582* (2013.01); *H01M 4/661* (2013.01); *H01M 4/663* (2013.01); *H01M 4/667* (2013.01); *H01M 10/054* (2013.01); *H01M 10/0525* (2013.01); *H01M 2300/002* (2013.01)

(56) References Cited

U.S. PATENT DOCUMENTS

| | | | |
|---|---|---|---|
| 5,145,755 A | | 9/1992 | Schlaikjer et al. |
| 2010/0283429 A1 | | 11/2010 | Ofer et al. |
| 2012/0077082 A1 | | 3/2012 | Se-hee et al. |
| 2012/0115030 A1 | * | 5/2012 | Tanaka ............... H01M 10/4235 428/323 |
| 2014/0065465 A1 | | 3/2014 | Johnson et al. |
| 2016/0079598 A1 | | 3/2016 | Jeong et al. |
| 2016/0118685 A1 | * | 4/2016 | Zhang ................ H01M 10/056 429/231.95 |
| 2016/0276705 A1 | | 9/2016 | Hambitzer |
| 2016/0285128 A1 | * | 9/2016 | Matsui ................. H01M 4/405 |
| 2017/0047612 A1 | * | 2/2017 | Zinck ................ H01M 10/0525 |
| 2017/0279162 A1 | * | 9/2017 | Vissers ............... H01M 50/451 |

FOREIGN PATENT DOCUMENTS

| | | |
|---|---|---|
| EP | 2999037 | 3/2016 |
| JP | 2004-536427 A | 12/2004 |
| RU | 2402840 C2 | 10/2010 |
| WO | 2013127684 | 9/2013 |
| WO | 2017055678 | 4/2017 |
| WO | 2017055678 A1 | 4/2017 |

OTHER PUBLICATIONS

Stassen et al., "Metallic lithium batteries for high power applications", Journal of Power Sources, vol. 105, pp. 145-150 (2002).
European Patent Application No. 18 842 056.6, "Extended European Search Report", 10 pages (2021).
Finnish Patent Application No. 20175712, "Search Report", dated Feb. 12, 2018, 2 pages.
International Patent Application No. PCT/FI2018/050571, "International Search Report and Written Opinion", dated Nov. 27, 2018, 13 pages.
BR112020002380-9 Office Action dated Jul. 1, 2022, 4 pages.
CN 201880050133.6, "First Office Action" dated Jul. 9, 2022, 14 pages (including English translation).

* cited by examiner

ELECTROCHEMICAL CELLS FOR HIGH-ENERGY BATTERY USE

FIELD OF THE INVENTION

The present invention relates to rechargeable electrochemical cells. In particular, the present invention concerns the aforesaid cells utilizing novel salt cathodes and salt-metal cathodes supporting high energy density, which may be used with $SO_2$ based electrolytes.

BACKGROUND

High performance and low cost electrochemical cells, such as batteries, are advantageous for many applications in, e.g., mobile electronics, energy generation and distribution and transportation. Inventions which can further improve cell performance are beneficial to industry and commerce.

SUMMARY OF THE INVENTION

The present invention advances the state-of-the art in rechargeable (secondary) electrochemical cells. The groundwork for battery cells utilizing metallic sodium anodes has been laid in FI 20150270. This invention discloses significant improvements in various aspects over the battery cells, basic electrochemical cell structure, operating principles and performance disclosed in therein, such as higher cell voltage and higher Coulombic efficiency, and is also applicable to improve performance of other battery chemistry families. The objective of the present invention is to disclose high-performance electrochemical cells for, e.g., secondary high-energy batteries. The apparatus according to the present invention is characterized by what is presented in the claims.

According to a first aspect of the invention, a cathode for a rechargeable electrochemical cell is described. The cathode may be used for a charged state assembled, a discharged state assembled and/or a semi-charged (semi-discharged) state assembled rechargeable electrochemical cell. The cell in which the cathode is used may have an $SO_2$ solvent based electrolyte. The cathode may comprise one or more alkali halides. The alkali metal in the one or more alkali halides may be, for instance, lithium, sodium, potassium, rubidium, caesium and/or francium. The alkali halide of the one or more alkali halides may be a fluoride, chloride, bromide, iodide and/or astatide. The alkali halide of the cathode may be, for instance, NaF, NaCl, NaBr, NaI, LiF, LiCl, LiBr, LiI, or any mixture thereof. Other alkali halides are possible according to the invention. The cathode may comprise one or more transition metal compounds. The one or more transition metals may be partially oxidized transition metals. The one or more partially oxidized transition metals may be in the form of one or more partially oxidized transition metal compounds. The one or more partially oxidized transition metal compounds may be one or more partially oxidized transition metal halides. The one or more partially oxidized transition metal halides may take the form $M_yX$, wherein M is a partially oxidized transition metal, X is a halide and y is the ratio M/X such that said transition metal may be in a partially oxidized state. The one or more partially oxidized transition metal halides may be, for instance, $Cu_yBr$, $Cu_yI$, $Cu_yCl$, $Cu_yF$ (where y is greater than 0.5) or any mixture thereof. The transition metal compounds may be fully oxidized. The one or more fully oxidized transition metal compounds may be transition metal halides. The transition metal halides may be fully oxidized. The fully oxidized transition metal halides may be, for instance, $CuBr_2$, $CuI_2$, $CuCl_2$, $CuF_2$ or combinations thereof. Other transition metal halides (fully oxidized and partially oxidized) are possible according to the invention. The transition metal halide may be used alone or in addition to or in combination with an alkali metal halide. The alkali metal halide may be used, alone or in addition to or in combination with a transition metal halide. The cathode may further comprise one or more elemental and/or partially oxidized transition metals or mixture of several elemental and/or partially oxidized transition metals. The one or more elemental and/or partially oxidized transition metals may be in addition to the alkali metal and/or transition metal halide. The elemental transition metal may be elemental copper. Other elemental transition metals are possible according to the invention. Examples of elemental transition metals include but are not limited to, for instance, scandium, titanium, vanadium, chromium, manganese, iron, cobalt, nickel, zinc, yttrium, zirconium, niobium, molybdenum, technetium, ruthenium, rhodium, palladium, silver, cadmium, lutetiumlanthanum, hafnium, tantalum, tungsten, rhenium, osmium, iridium, platinum, gold, mercury, actinium, rutherfordium, dubnium, seaborgium, bohrium, hassium, meitnerium, darmstadtium and/or roentgenium. Lanthanum, bismuth, lead, indium, tin, gallium and germanium may also be considered elemental transition metals according to the invention. The one or more partially oxidized transition metals may be one or more component of one or more partially oxidized transition metal compounds, $M_yA$, where M is a partially oxidized transition metal, A is an oxidizer and y is the ratio of M/A such that said transition metal may be in a partially oxidized state. A may be, for instance oxygen, nitrogen, sulphur, antimony or cyanide or any combination thereof. Examples of partially oxidized transition metal compounds include but are not limited to $Sc_yA$, $Ti_yA$, $V_yA$, $Cr_yA$, $Mn_yA$, $Fe_yA$, $Co_yA$, $Ni_yA$, $Cu_yA$, $Zn_yA$ where A may be, for instance, oxygen (thus forming an oxide), nitrogen (thus forming a nitride), sulfur (thus forming a sulfide), antimony (thus forming an antimonide) or cyano (thus forming a cyanide) or any combination thereof. M of the transition metal compound, $M_yA$, may be Cu. A of the transition metal compound, $M_yA$, may be O. y of the transition metal compound, $M_yA$, may be greater than 1, in which case, the transition metal compound is a partially oxidized transition metal compound. The transition metal compound, $M_yA$, may be $Cu_yO$ where y is greater than 1, in which case, the transition metal compound is a partially oxidized transition metal compound. Other fully or partially oxidized transition metals and fully or partially oxidized transition metal compounds are possible according to the invention. The cathode may comprise multiple fully or partially oxidized transition metals and/or fully or partially oxidized transition metal compounds and any combination thereof. In the as-prepared state of the cathode at the time of assembly, the alkali halide:transition metal molar ratio may be in any ratio above 1:0. A preferable ratio is, at least, 1:1. A more preferable ratio is between 1:1 and 5.1.

According to a second aspect of the invention, an $SO_2$ solvent based electrolyte is described comprising a halide-containing salt additive. The halide-containing salt additive may be a fluorine-containing salt additive. The fluorine-containing salt additive may be, for instance, Na-DFOB (Sodium-difluoro-oxalato-borate), Li-DFOB (Lithium-difluoro-oxalato-borate), Na-Triflate (Sodium-trifluoromethane-sulfonate), or Li-Triflate (Lithium-trifluoromethane-sulfonate) or a combination thereof. Other halide-containing salt additives are possible according to the invention.

According to third aspect of the invention, an $SO_2$ solvent based electrolyte is described comprising a mixture of alkali metal electrolyte salts. The alkali metal salts may be lithium and/or sodium electrolyte salts. The electrolyte salts may comprise a mixture of $LiAlCl_4$ and $NaAlCl_4$. Other alkali metal electrolyte salts are possible according to the invention.

According to a fourth aspect of the invention, an anode current collector for a rechargeable electrochemical cell is described comprising a carbon coated metal, an alloy of two or more metals or a carbon coated alloy of two or more metals. The carbon coated metal anode current collector may be carbon coated aluminium. The current collector comprising an alloy of two or more metals may be copper-nickel alloy. Other carbon coated metals are possible according to the invention. Other alloys of alloys are possible according to the invention.

According to a fifth aspect of the invention, an electrochemical cell is disclosed comprising any of the described cathodes of the first aspect of the invention, wherein the electrolyte is, at least in part, $SO_2$ solvent based.

According to a sixth aspect of the invention, an electrochemical cell is disclosed comprising any of the described electrolytes of the second and/or third aspects of the invention and/or any of the described cathodes of the first aspect of the invention and/or any of the described anode current collectors of the fourth aspect of the invention.

According to a seventh aspect of the invention, one or more non-dissolved/solid alkali halides may be added to the cell. For instance, in the case of a cell comprising a cathode comprising NaCl, excess NaCl may be added to the cell that is in a solid state and not dissolved in the electrolyte. The non-dissolved/solid alkali halide may be, for instance, NaF, NaCl, NaBr, NaI, LiF, LiCl, LiBr, LiI, Other non-dissolved/solid alkali halides are possible according to the invention.

According to an eighth aspect of the invention, the use any of the described electrolytes of the second and/or third aspects or the invention and/or any of the described cathodes of the first aspect of the invention and/or any of the described anode current collectors of the fourth aspect of the invention in a device. The device may be, for instance, an electronic device, an electrical device, an a mobility device, a power delivery device or an energy storage device. Examples of electronic devices include, for instance computing devices and communication devices. Examples of electrical devices include, for instance, power tools, motors and robots. Examples of mobility devices include, for instance, electric vehicles. Examples of energy storage devices include, for instance, batteries, battery packs, energy and power storage units for, for instance, backup power or energy, local, district or regional power or energy grids, uninterrupted power supply. Examples of power delivery devices include, for instance, engine starter batteries. A device may be a combination of an electrochemical cell according to the invention and one or more components making use of the power and/or energy supplied by the electrochemical cell. A device may be a charging device to supply power and/or energy to the electrochemical cell.

Any of the described electrochemical cells may be assembled in charged, semi-charged or discharged state. In discharge state assembly, the anode current collector may comprise essentially no alkali metal when the cell is assembled. In discharge or semi-charged state assembly, one or more alkali metals may be deposited in metallic form on the current collector during charging. Said deposition may occur during the first charging of the cell. Said first charging may occur after the cell is assembled. In charged are semi-charged state assembly, the anode current collector may comprise a deposit or layer of alkali metal when the cell is assembled.

Here an $SO_2$ solvent based electrolyte is understood to mean any electrolyte for an electrochemical cell comprising $SO_2$ as a significant component, preferably at least 10% mole fraction and more preferably at least 25% mole fraction and more preferably at least 50% mole fraction of the employed solvent materials. Other mole fractions of $SO_2$ are possible according to the invention.

In an embodiment, the cell is provided with art alkali-halide salt based cathode, selected from NaF, LiF, NaCl, LiCl, NaBr, LiBr, NaI, LiI, or mixtures thereof. Other alkali-halides are possible according to the invention. An alkali-halide is a compound containing, at least, an alkali metal and a halogen. Examples of alkali metals include lithium, sodium, potassium, rubidium, caesium and francium. Examples of halides include fluorine, chlorine, bromine, iodine, and astatine.

Here alkali-halide salt based cathode is understood to mean any cathode for an electrochemical cell which can comprise one or more alkali-halide salts as a significant component, preferably at least 1% mote fraction and more preferably at least 5% mole fraction and more preferably at least 10% mole fraction and more preferably at least 20% mole fraction of the employed cathode materials. Other mole fractions of alkali-halide salts are possible according to the invention.

The alkali-halide salt based cathode may be used as a discharged state assembled active ingredient, i.e., the cell may be in the discharged state upon assembly. Such a cell is termed a "discharged state assembled" cell. The cathode may be used as a charged state assembled active ingredient, i.e., the cell may be in the charged state upon assembly. The cathode may be used as a semi-charged (semi-discharged) state assembled active ingredient, i.e., the cell may be in the semi-charged or semi-discharged state upon assembly. Here semi-charged and semi-discharged are equivalent. Such a cell is termed a "semi-discharged state assembled" or a "semi-charged state assembled" cell. The cell may comprise the use of further additives disclosed herein for raising the cell efficiency, voltage and energy density.

In one embodiment of the invention, the anode current collector comprises an alloy. The alloy may be a Cu—Ni alloy. Other alloys are possible according to the invention. A current collector can also act as a mechanical support, for instance, for the anode. The current collector may act as a mechanical support in the case when there is no significant anode material on the anode current collector, e.g. when the cell is in discharged state. The current collector may act as a mechanical support in the case when the anode material alone does not have sufficient mechanical integrity in the cell.

It has been surprisingly discovered that Cu—Ni alloy anode current collectors are stable in $SO_2$ based electrolytes during the entire charging cycle, even when the cell is in the charged state for extended time periods, and so can act as an effective and robust current collector/mechanical support. Importantly, the Na-over-substrate deposition yields a smoother surface than in the case of, for instance, a pure Ni substrate. This results in improved Coulombic Efficiency and longevity of the cell operation. The Cu—Ni alloy substrate material has been discovered to be suitable even for reversible Li-over-substrate deposition, and, thereby, opens the possibility for the use of Li-based salts in the disclosed battery cell. Possible Cu:Ni ratios are between 10:90 and 90:10, and more preferably between 20:80 and 80:20 and more preferably between 40:60 and 60:40 and most preferably approximately the 55:45 ratio, which is known as Constantan. Additional alloy constituents in addition to or instead of Cu and Ni are possible according to the invention.

In one embodiment of the invention, the anode current collector comprises a carbon-coated metal. The carbon-coated metal may be aluminum. It has been surprisingly discovered that carbon-coated aluminum anode current collectors are stable in $SO_2$ based electrolytes, and facilitate reversible deposition of metallic Na-over-substrate and Li-over-substrate during the charging cycle.

In one embodiment of the invention, the cathode active material may comprise Li-based salts. Correspondingly, the electrolyte salt may comprise $LiAlCl_4$. The electrolyte may be $SO_2$ based.

When the electrolyte is $SO_2$ based, the corresponding electrochemical cell may be $SO_2$ electrolyte based. The formulation may be $LiAlCl_4 \cdot xSO_2$ where x is preferably between 1 and 5 and more preferably between 1.5 and 3 and more preferably between 1.8 and 2.2 and most preferably approximately 2. In one embodiment of the invention, the electrolyte salt may also comprise $NaAlCl_4$. It has been discovered that the presence of $NaAlCl_4$ in the electrolyte improves the smoothness and reversibility of Li deposition. The molar ratio of $LiAlCl_4:NaAlCl_4$ is preferably between are between 10:90 and 99.999:0.001, and more preferably between 90:10 and 95:5. Other transition metal based electrolyte salts are possible according to the invention. Other ratios of electrolyte salts are possible according to the invention. Other combinations of upper lower limits of the ratio of electrolyte salts are possible according to the invention.

In one embodiment of the invention, the electrolyte may also comprise Fluorine-containing salts as an additive. The Fluorine-containing salt additive may act as an SEI-forming additive. The additive may modify the SEI between the anode and the electrolyte. It has been discovered that the presence of a Fluorine-containing salt additive improves the Coulombic efficiency and longevity of battery cells disclosed in this invention. Na-DFOB (Sodium-difluoro-oxalato-borate), Li-DFOB (Lithium-difluoro-oxalato-borate), Na-Triflate (Sodium-trifluoromethane-sulfonate), or Li-Triflate (Lithium-trifluoromethane-sulfonate) are particularly preferable Fluorine-containing additive salts. Without intending to be bound by theory, the Fluorine-containing salt additive is thought to improve the anode SEI during the initial charging of alkali-halide cathodes. The concentration of Fluorine-containing salt additive is preferably between 0.0001% and 5% of the electrolyte mass, and more preferably between 0.1% and 3% of the electrolyte mass, and most preferably between 0.5% and 2% of the electrolyte mass. Other concentrations of Fluorine-containing salt additive are possible according to the invention. Other combinations of limits of concentration of Fluorine-containing salt additive are possible according to the invention.

In one embodiment of the invention, a cathode for a rechargeable electrochemical cell is disclosed comprising one or more alkali halides and one or more transition metals. These may be discharged state assembled active ingredients. The alkali halide may be selected from LiF, LiCl, LiBr, LiI, NaF, NaCl, NaBr, NaI, or any mixtures thereof. The one or more transition metals may be mixtures or alloys of transition metals. In one embodiment, the transition metal is elemental copper. Other alkali halides are possible according to the invention. Other transition metals and alloys thereof are possible according to the invention.

An SEI (Solid Electrolyte Interface) may be an anode SEI or a cathode SEI. SEI is here defined as a film or layer which allows targeted ions to pass but which either does not allow one or more other materials/molecules to pass. Such blocked/filtered materials may include those that are reactive with the electrode (anode and/or cathode) or other battery materials/components (e.g. current collectors) or which otherwise have a detrimental effect on the electrode or electrode material or other battery materials/components such as current collectors or current collector material.

For the avoidance of doubt, an SEI-forming and/or enhancing material, film or layer is a material, film or layer which itself forms an SEI, acts as a precursor to an SEI, combines with an existing SEI or otherwise enhances the function of an SEI.

For the avoidance of doubt, a cation conducting material, film or layer is a material, film or layer which allows the cations, which may be, for instance, alkali cations, to migrate across the material, film or layer.

For the avoidance of doubt, an anode or a cathode current collector may also act as a support structure/mechanical support.

According to one embodiment of the invention, an electrochemical cell may comprise the abovesaid cathode configuration, an $SO_2$ based electrolyte, an electrolyte additive of a fluorine-containing salt and/or $NaAlCl_4$, and a Cu—Ni alloy current collector on the anode side.

DETAILED DESCRIPTION OF THE EMBODIMENTS

Figure 1:
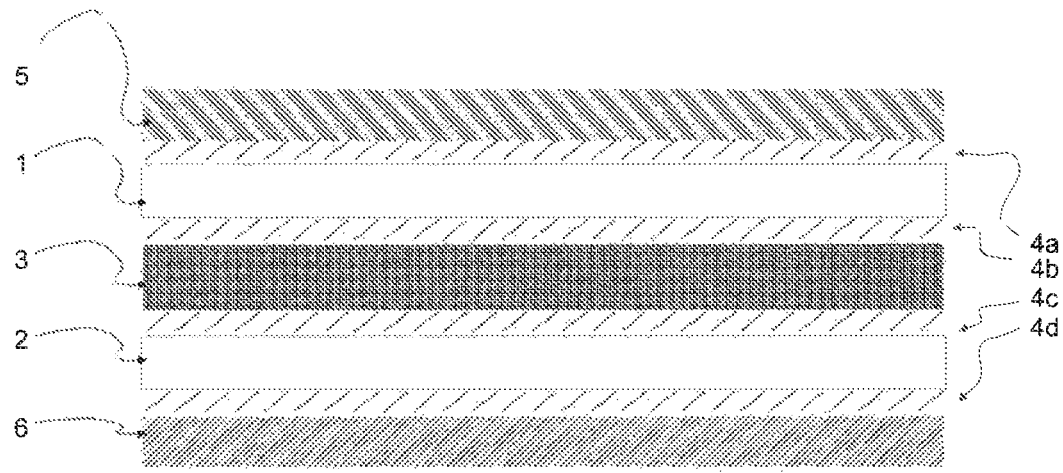
FIG. 1 shows a cross section of an electrochemical cell in charged state or semi-charged state according to the invention having an anode (1), a cathode (2), an electrolyte (3) and which may also comprise one or more SEI layers (4), an anode current collector (5) and/or a cathode current collector (6).

Detailed embodiments of the present invention are disclosed herein with the reference to accompanying drawings.

The following paragraphs describe improvements related to high energy-density battery cells, where the electrolyte is based on $SO_2$ solvent.

A cathode for a discharged state assembled or semi-charged state assembled rechargeable electrochemical cell having an $SO_2$ solvent based electrolyte comprising one or more elemental transition metals and/or one or more partially oxidized transition metals is described. At least one of the one or more partially oxidized transition metals may be a component of a partially oxidized transition metal compound. At least one of the one or more partially oxidized transition metal compounds may be of the form, $M_yA$, where M is a partially oxidized transition metal, A is an oxidizer and y is the ratio of M/A such that said transition metal is in a partially oxidized state. At least one of the one or more oxidizers, A, may be oxygen, nitrogen, sulfur, antimony or cyanide or any combination thereof. At least one of the one or more partially oxidized transition metal compounds may be an oxide, a sulfide, a halide, a cyanide, a nitride or any combination thereof. At least one of the one or more transition metal halides may comprise $Cu_yBr$, $Cu_yI$, $Cu_yCl$, $Cu_yF$, where y is greater than 0.5 or any combination thereof. At least one of the one or more partially oxidized transition metal oxides may comprise $Cu_yO$ where y is greater than 1. At least one of the one or more elemental transition metals may comprise Cu. The cathode may further comprise one or more alkali halides. The one or more alkali halides may comprise NaF, NaCl, NaBr, NaI, LiF, LiCl, LiBr, LiI, or any combination thereof. At the time of assembly, the alkali halide:transition metal compound molar ratio may be greater than 1:0.

An $SO_2$ solvent based electrolyte comprising a halide-containing salt additive as para SEI-forming additive is described. The halide-containing salt additive may comprise a fluorine-containing salt additive. The fluorine-containing salt additive may comprise Na-DFOB (Sodium-difluoro-oxalato-borate), Li-DFOB (Lithium-difluoro-oxalato-borate), Na-Triflate (Sodium-trifluoromethane-sulfonate), or Li-Triflate (Lithium-trifluoromethane-sulfonate) or a combination thereof.

An $SO_2$ solvent based electrolyte comprising a mixture of alkali metal electrolyte salts is described. The alkali metal electrolyte salts may be lithium and sodium electrolyte salts. The electrolyte salts may comprise a mixture of $LiAlCl_4$ and $NaAlCl_4$.

An anode current collector for a rechargeable electrochemical cell having an $SO_2$ solvent based electrolyte comprising a carbon coated metal, an alloy of two or more metals or a carbon coated alloy of two or more metals is described. The carbon coated metal may comprise carbon coated aluminium and/or wherein the alloy comprises a copper-nickel alloy.

An electrochemical cell having at least a cathode, an anode and an electrolyte comprising any of the described electrolytes and/or any of the described cathodes and/or any of the described anode current collectors is described.

An electrochemical cell comprising, at least, said anode and electrolyte and a cathode is described. The cathode may comprise one or more elemental transition metals and/or one or more partially oxidized transition metals. At least one of the one or more partially oxidized transition metals may be a component of a partially oxidized transition metal compound. At least one of the one or more partially oxidized transition metal compounds may be of the form, $M_yA$, where M is a partially oxidized transition metal, A is an oxidizer and y is the ratio of M/A such that said transition metal is in a partially oxidized state. At least one of the one or more oxidizers, A, may be oxygen, nitrogen, sulfur, antimony or cyanide or any combination thereof. At least one of the one or more partially oxidized transition metal compounds may be an oxide, a sulfide, a halide, a cyanide, a nitride or any combination thereof. At least one of the one or more transition metal halides may comprise $Cu_yBr$, $Cu_yI$, $Cu_yCl$, $Cu_yF$, where y is greater than 0.5 or any combination thereof. At least one of the one or more partially oxidized transition metal oxides may comprise $Cu_yO$ where y is greater than 1. At least one of the one or more elemental transition metals comprises Cu. The cathode may further comprise one or more alkali halides. The one or more alkali halides may comprise NaF, NaCl, NaBr, NaI, LiF, LiCl, LiBr, LiI, or any combination thereof. At the time of assembly, the alkali halide:transition metal compound molar ratio may be greater than 1:0. The $SO_2$ solvent based electrolyte may comprise a halide-containing salt additive as an SEI-forming additive. The halide-containing salt additive may comprise a fluorine-containing salt additive. The fluorine-containing salt additive may comprise Na-DFOB (Sodium-difluoro-oxalato-borate), Li-DFOB (Lithium-difluoro-oxalato-borate), Na-Triflate (Sodium-trifluoromethane-sulfonate), or Li-Triflate (Lithium-trifluoromethane-sulfonate) or a combination thereof. The $SO_2$ solvent based electrolyte may comprise a mixture of alkali metal electrolyte salts. The alkali metal electrolyte salts may be lithium and sodium electrolyte salts. The electrolyte salts may comprise a mixture of $LiAlCl_4$ and $NaAlCl_4$. One or more excess non-dissolved/solid alkali halides may be added to the cell. The excess non-dissolved/solid alkali halide may comprise NaF, NaCl, NaBr, NaBr, NaI, LiF, LiCl, LiBr, LiI, or any mixture thereof. The cell may further comprise a spacer/separator between the anode current collector and the cathode.

An electrochemical cell having at least a cathode, an anode and an electrolyte comprising an $SO_2$ solvent based electrolyte; and any of the described cathodes and/or anode current collectors is described.

Any of the described electrochemical cells, wherein, one or more excess non-dissolved/solid alkali halides are added to the cell is described. The excess non-dissolved/solid alkali halide may comprise NaF, NaCl, NaBr, NaI, LiF, LiCl, LiBr, LiI, or any mixture thereof. The cell may further comprise a spacer/separator between the anode current collector and the cathode.

The use of any of the described electrolytes, any of the described cathodes, any of the described anode current collectors and/or any of the described electrochemical cells in a device is described. The use of the described anode current collector and/or any of the described electrochemical cells in a device is described.

FIG. 1 shows a cross section of an embodiment of an electrochemical cell according to the invention in charged state or semi-charged state according to the invention having an anode (1), a cathode (2), an electrolyte (3) and which may also comprise one or more SEI layers (4), an anode current collector (5) and/or a cathode current collector (6). The cell may additionally have a spacer and/or a separator (7, not shown) between any of the anode (1), the anode current collector (5), SEI layer 4a or SEI layer 4b and any of the cathode (2), the cathode current collector (6), SEI layer 4b, SEI layer 4c or SEI layer 4d. According to the invention 0, 1, 2, 3 or 4 SEI layers may be present.

Figure 2:
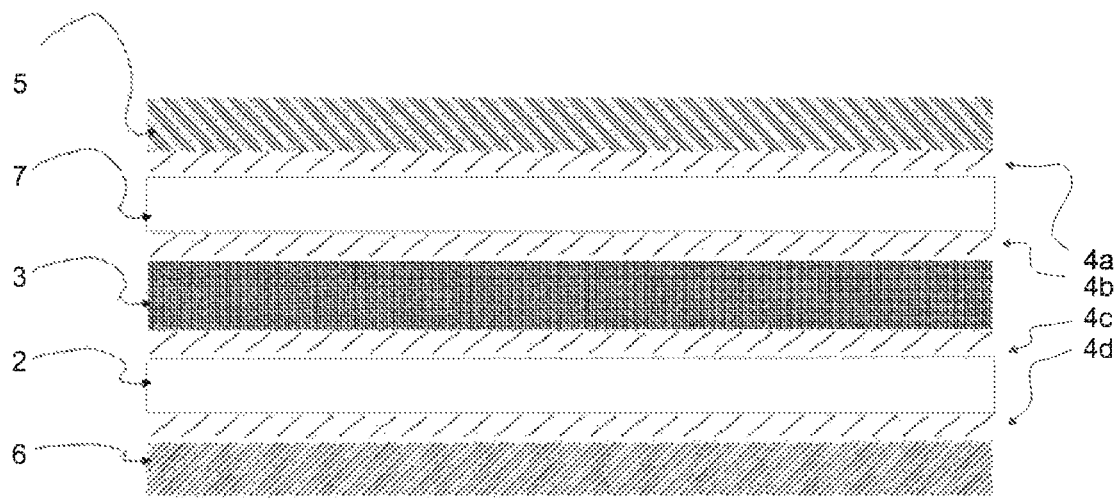
FIG. 2 shows a cross section of an electrochemical cell in discharged state according to the invention having an a cathode (2), an electrolyte (3) and which may also comprise one or more SEI layers (4), an anode current collector (5) and/or a cathode current collector (6)

FIG. 2 shows a cross section of an embodiment of an electrochemical cell according to the invention in discharged state or semi-charged state according to the invention having a cathode (2), an electrolyte (3) and which may also comprise one or more SEI layers (4), an anode current collector (5) and/or a cathode current collector (6). The cell may additionally have a spacer and/or a separator (7) which is here shown to be between SEI layer 4a and SEI layer 4b but which may be between any of the anode current collector (5), SEI layer 4a or SEI layer 4b and any of the cathode (2), the cathode current collector (6), SEI layer 4b, SEI layer 4c or SEI layer 4d. According to the invention 0, 1, 2, 3 or 4 SEI layers may be present. The spacer/separator may serve to allow space for the anode to grow during charging. The spacer/separator may serve to physically separate the anode and the cathode and/or their associated SEI layers. The spacer/separator may serve to allow space for the electrolyte to exist inside the cell. According to one embodiment of the invention, the spacer/separator may be composed of a porous material or otherwise contain a significant amount of void space. Preferably the fraction of void space is greater than 10% and more preferably greater than 20% and more preferably greater than 40% and more preferably greater than 60% and more preferably greater than 70% and most preferably greater than 80%. The spacer/separator may comprise any material compatible with the electrolyte. The spacer/separator may comprise cellulose and/or $SiO_2$. Other materials for the spacer/separator are possible according to the invention.

Any combination of the cell structures shown in FIG. 1 and FIG. 2 are possible according to the invention. Any components 1-7 in FIG. 1 and FIG. 2 may overlap or be intermingled with another component according to the invention.

It has been surprisingly discovered that LiCl may be used reversibly as active cathode material in battery cells comprising cells using $LiAlCl_4 \cdot xSO_2$ type electrolyte. LiCl-based cathodes have been constructed by LiCl infusion into a carbon-based framework. Upon cycling such LiCl active cathode material based battery cells, close to 90% of the theoretical 600 mAh/g discharge capacity with respect to the LiCl mass has been obtained.

In the case of LiCl based cathode with $LiAlCl_4 \cdot xSO_2$ type electrolyte, the required charging voltage may be in the range of 4.4-4.6 V vs. the Li/Li+ reference. The use of NaCl cathode material has been described in FI 20150270 in conjunction with an anode substrate facilitating the deposition of metallic Na in the anode side. The equivalent approach for metallic lithium deposition is known to be problematic because of the tendency for dendritic lithium deposition. Several complementary methods have been surprisingly discovered for achieving highly reversible, dendrite free metallic Li deposition. even in $LiAlCl_4 \cdot xSO_2$ type electrolyte. Firstly, it has been surprisingly discovered that Cu—Ni alloys are stable in $SO_2$ based electrolytes during the entire charging cycle, and that the Na-over-substrate and Li-over-substrate depositions yield a smoother surface than in the case of a Ni substrate. This results in improved Coulombic Efficiency and better longevity of the cell operation. Possible Cu:Ni ratios are between 10:90 and 90:10, and more preferably between 20:80 and 80:20 and more preferably between 40:60 and 60:40 and most preferably approximately the 55:45 ratio which is known as Constantan. Additional alloy constituents in addition to or instead of Cu and Ni are possible according to the invention. As alternative to the Cu—Ni alloys, it has been discovered that carbon-coated metals and alloys are also stable in $SO_2$ based electrolytes during the entire charging cycle, and that the Na-over-substrate and Li-over-substrate depositions over carbon-coated metals and alloy substrates are sufficiently smooth in these $SO_2$ based electrolytes for stable cell cycling. In particular, aluminum and aluminum alloys have been discovered to be stable in based electrolytes during the entire charging cycle, and that the Na-over-substrate and Li-over-substrate depositions over carbon-coated metals and alloy substrates are sufficiently smooth in these $SO_2$ based electrolytes for stable cell cycling. Aluminum-based substrates have an advantage over Cu—Ni alloys due to lower cost and lighter mass. Secondly, it has been surprisingly discovered that the presence of sodium salts, such as $NaAlCl_4$, in the electrolyte improves the smoothness and reversibility of Li deposition. Without intending to be bound by theory, the electrolyte's $NaAlCl_4$ content causes an initial deposition of smooth metallic Na at the early phase of charging, which improves the smoothness and reversibility of subsequent metallic Li deposition. Possible $LiAlCl_4$:$NaAlCl_4$ ratios are between 10:90 and 99.999:0.001, and more preferably between 90:10 and 95:5. Thirdly, it has been discovered that the presence of a fluorine-containing salt additive improves the Coulombic efficiency and longevity of battery cells disclosed in this invention. Without intending to be hound by theory, the fluorine-containing salt additive is thought to improve the anode SEI during the initial charging of alkali-halide cathodes. Na-DFOB (Sodium-difluoro-oxalato-borate), Li-DFOB (Lithium-difluoro-oxalato-borate), Na-Initiate (Sodium-trifluoromethane-sulfonate), or Li-Triflate (Lithium-trifluoromethane-sulfonate) are particularly preferable additive salts. The fluorine-containing salts additive may be added to the electrolyte preferably between 0.0001% and 5% mass ratio, and more preferably between 0.1% and 3% mass ratio, and most preferably between 0.5% and 2% mass ratio. The abovesaid three discoveries may be employed individually or in any combination in order to achieve a suitable deposition and cycling of metallic Li on the anode side.

Other alkali salt based cathodes may be constructed analogously NaCl or LiCl, by infusing NaF, LiF, NaBr, LiBr, NaI, LiI, or mixtures thereof, respectively into a carbon-based framework. In the case of NaCl or LiCl based cathode, a mixture of dissolved $Cl_2$ and $SO_2Cl_2$ is generated in the electrolyte upon charging. In the case of NaBr or LiBr based cathode, mainly dissolved $Br_2$ and is generated in the electrolyte upon charging, and the Coulombic efficiency of cell cycling is lower than in case NaCl or LiCl based cathode. In the case of NaI or LiI based cathode, mainly dissolved $I_2$ and is generated in the electrolyte upon charging, and the Coulombic efficiency or cell cycling is also lower than in case NaCl or LiCl based cathode. In the case of NaF or LiF based cathode, a mixture of dissolved $Cl_2$ and $SO_2Cl_2$ is generated in the electrolyte upon charging, and the $AlCl_4^-$ electrolyte salt anion is correspondingly transformed into $AlCl_3F^-$ through the uptake of $F^-$ from the cathode salt. The chargeable amount of NaF or LiF is, thus, limited by the available $AlCl_4^-$ electrolyte salt. The preferred alkali halide cathode materials are based on NaCl/LiCl, or a mixture between NaCl/LiCl and NaF/LiF.

Figure 3:
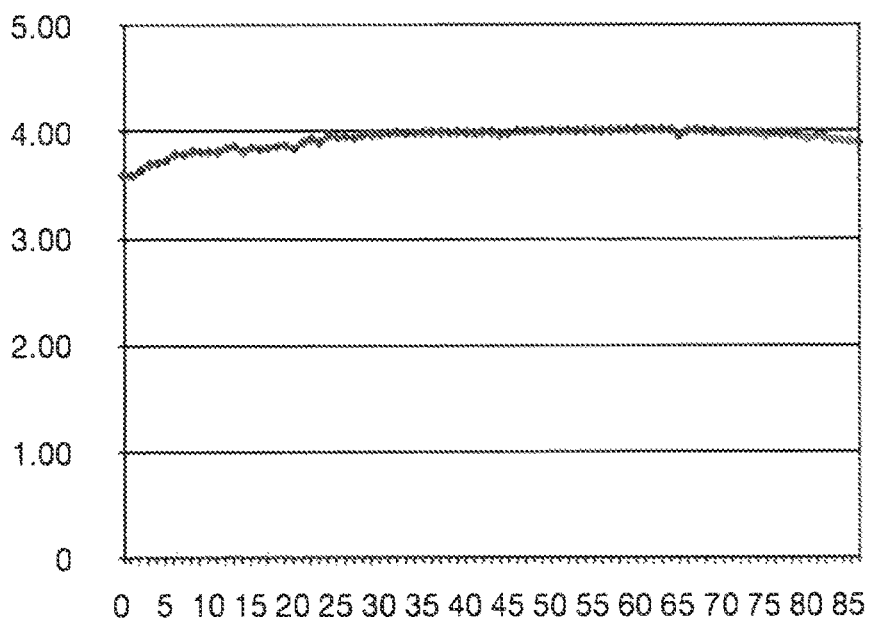
FIG. 3 shows the average discharge voltage evolution of the cell employing a NaCl based cathode and plain Constantan metal foil anode substrate. The horizontal axis indicates the number of cycles. The employed electrolyte is $NaAlCl_4 \cdot 2SO_2$. The geometric area of the working electrode is 2.5 cm$^2$.
Figure 4:
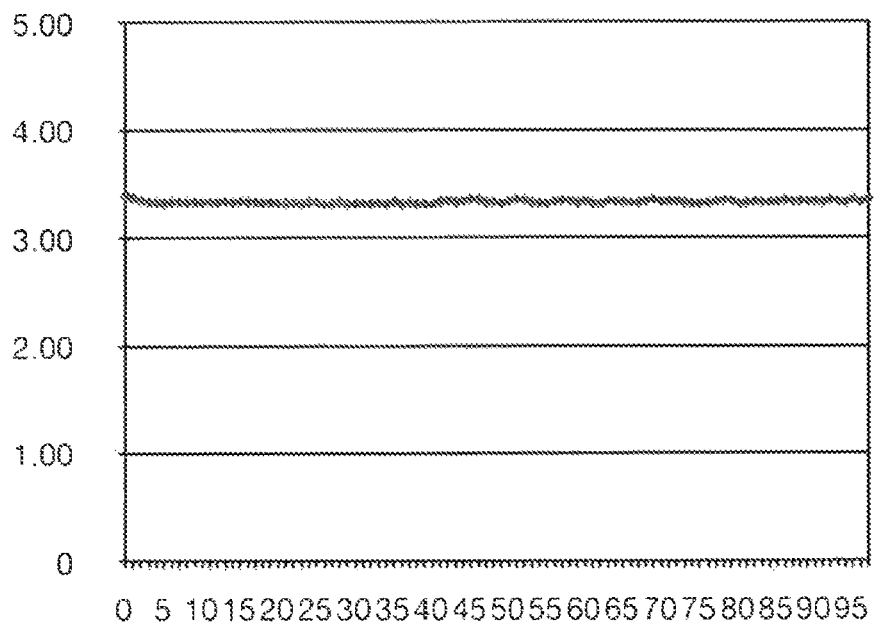
FIG. 4 shows the average discharge voltage evolution of the cell employing a 2NaCl:Cu formulation based cathode and Na metal anode. The horizontal axis indicates the number of cycles. The employed electrolyte is $NaAlCl_4 \cdot 2SO_2$. The geometric area of the working electrode is 2.5 cm$^2$.
Figure 5:
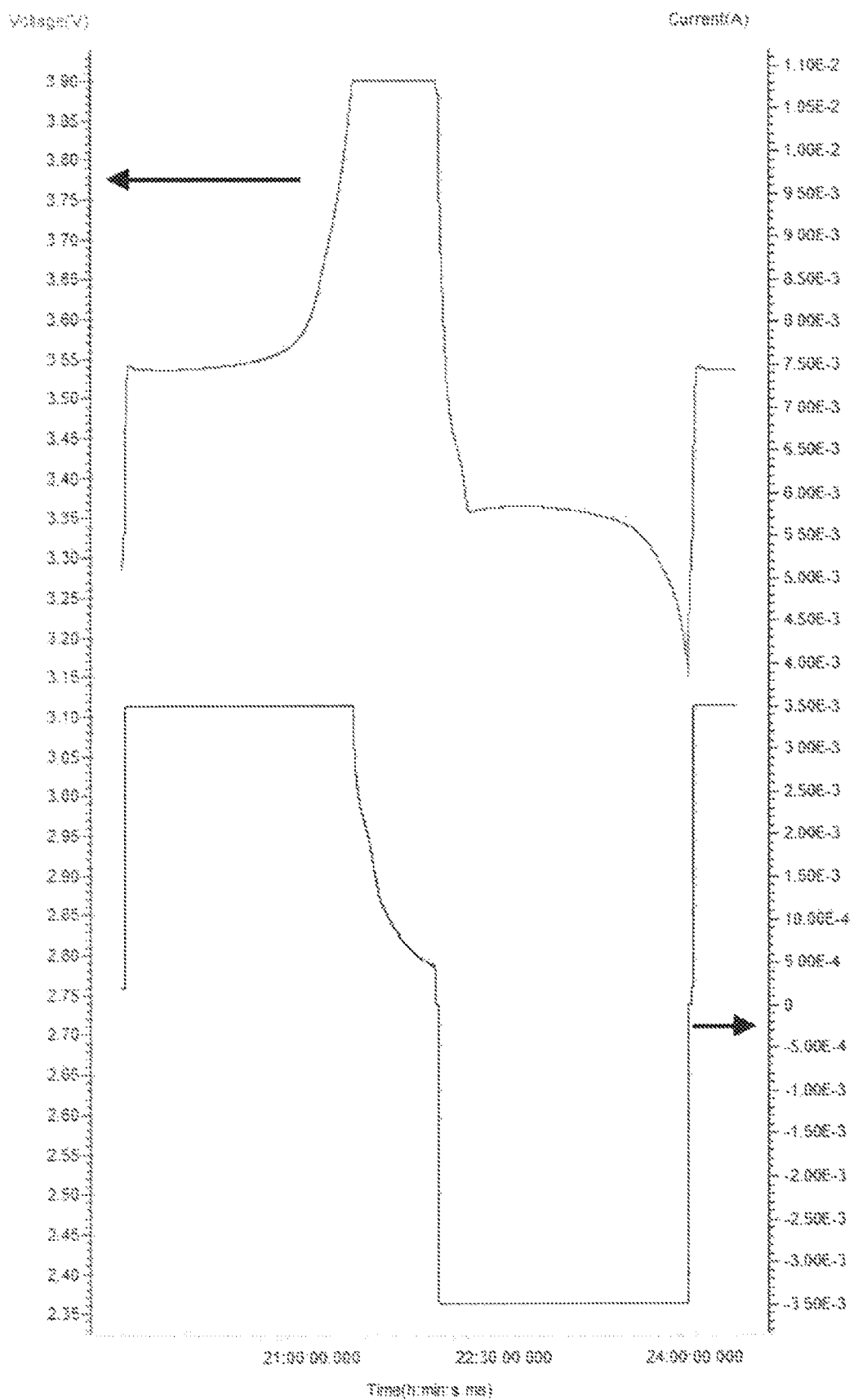
FIG. 5 shows one cycle voltage evolution of the cell employing a 2NaCl:Cu formulation based cathode and Na metal anode. The employed electrolyte is $NaAlCl_4 \cdot 2SO_2$. The geometric area of the working electrode is 2.5 cm$^2$.
Figure 6:
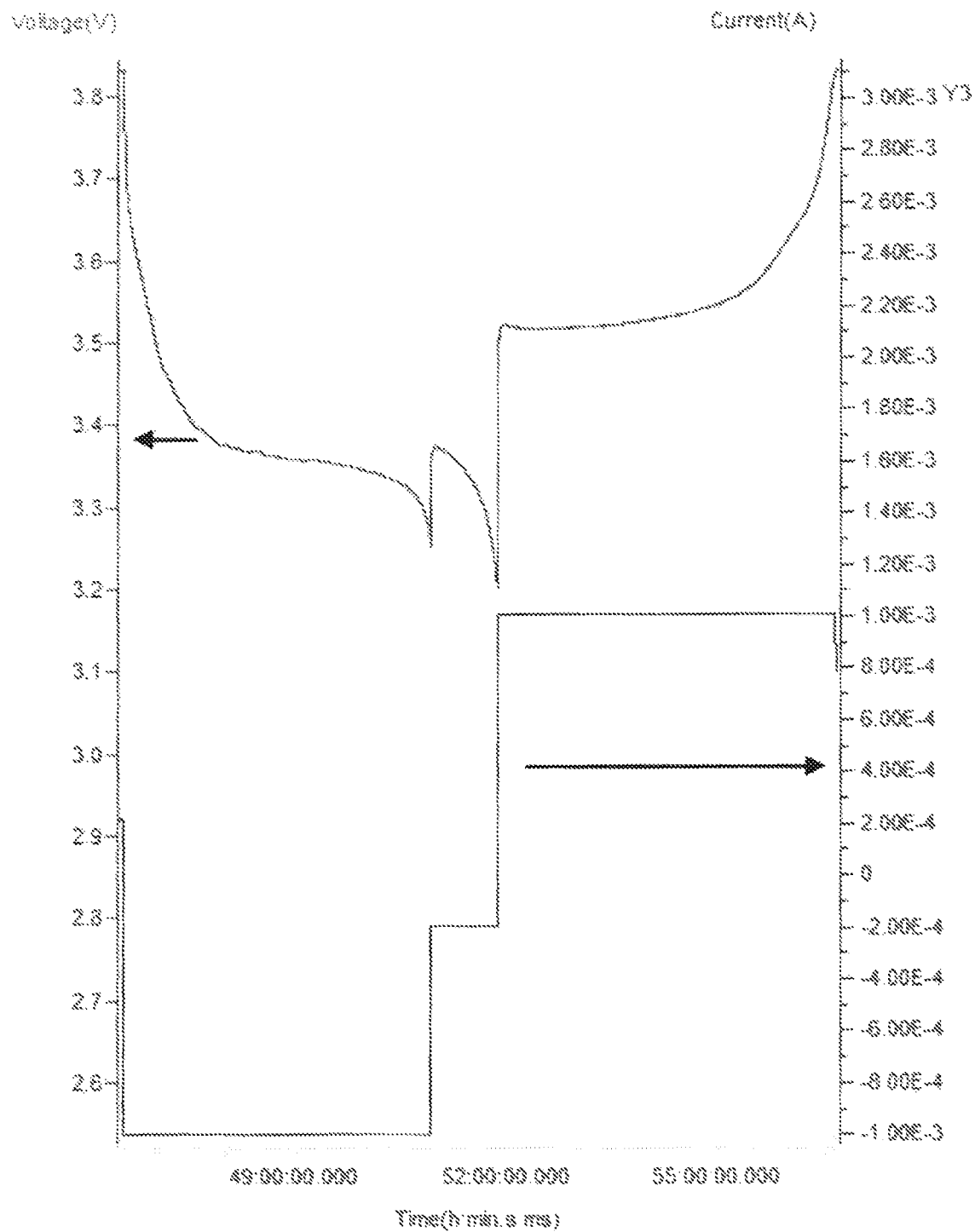
FIG. 6 shows one cycle voltage evolution of the cell employing a 2LiF:Cu formulation based cathode and Li metal anode. The employed electrolyte is $LiAlCl_2 \cdot 2SO_2$ with 1 wt % LiDFOB additive. The geometric area of the working electrode is 2.5 cm$^2$.

It has been furthermore discovered that, upon adding certain transition metals into the alkali salt containing cathode, such metals facilitate the uptake of chloride, and/or fluoride, and/or bromide, and/or iodide during the charging cycle, and allow a highly reversible subsequent battery cycling. Not to be bound by theory, it is understood that such metal additives remove or reduce the necessity of oxidized halide uptake by the electrolyte, and furthermore open the possibility for the use of alkali-fluoride based cathode compositions. Among the transition metals, elemental copper has been discovered to be a particularly preferred cathode constituent. Without intending to be bound by theory, the useful role of copper is thought to arise from its ability to be reversibly transformed between elemental +1 oxidized copper halides, such as CuF, CuCl, CuBr, or CuI and +2 oxidized copper halides, such as $CuF_2$, $CuCl_2$, $CuBr_2$, or $CuI_2$, without being reduced to elemental copper at the anode side in $SO_2$ based electrolytes. FIGS. 3 and 4 show the difference in cell voltage depending on the presence of copper, highlighting the different cell chemistry operation with the presence of copper. It has been surprisingly discovered that $SO_2$ based electrolytes facilitate such reversible conversion reaction starting from elemental copper, allowing the assembly of the cell in discharged state. The high round-trip energy efficiency of the resulting battery cells, which is in the range of 90-95%, and their very high cycling stability are particularly surprising aspects, since previously known conversion-type cathode based battery cells suffer from poor energy efficiency and fast capacity fading. FIG. 5 shows the cell voltage evolution of a cell comprising a 2NaCl:Cu cathode, and a metallic Na anode. FIG. 6 shows the cell voltage evolution of a cell comprising a 2LiF:Cu cathode and a metallic Li anode. The cell discharge data corresponding to FIG. 6 indicates the feasibility of fully utilizing the theoretical capacity of the 2LiF:Cu cathode. According to the invention, the $SO_2$ based electrolytes may comprise $NaAlCl_4 \cdot xSO_2$ or $LiAlCl_4 \cdot xSO_2$ formulations, or any mixtures thereof. The cathode active material may be comprised of alkali-halide:copper preferably between the 1:1 and 10:1 molar ratio range, and more preferably between the 1.5:1 and 3:1 molar ratio range, and most preferably between the 1.9:1 and 2.1:1 molar ratio range. In case of other transition metals and other alkali-halides, the preferred alkali-halide:metal molar ratio may be the same as in case of copper.

An alternative construction method to the discharged state assembly is to build the cells in the charged state. For instance, it has been surprisingly discovered that lithium-based batteries can also be assembled in the charged state using an anode already comprising metallic lithium, and a cathode comprising, a transition metal halide. The transition metal may be, for instance, copper. Other transition metals are possible according to the invention. For instance, copper-fluoride ($CuF_2$) may be infused into a conductive carbon framework to form a $CuF_2$ containing cathode. Other transition metal halides are possible according to the invention. During assembly, the metallic lithium anode may be an anode current collector already having a deposit or layer of lithium metal. The charged-state cell is operable with the same electrolyte which has been used for the discharged state cell construction. Any of the described anode current collectors are possible according to the invention.

EXAMPLES

Preparation of Electrolytes

Example 1

The $NaAlCl_4 \cdot 2SO_2$ electrolyte was synthesized according to The $LiAlCl_4 \cdot 2SO_2$ electrolyte through the same procedure, with the use of LiCl precursor instead of NaCl.

Example 2

The electrolyte with the desired $NaAlCl_4$:$LiAlCl_4$ ratio was prepared by mixing $NaAlCl_4 \cdot 2SO_2$ and $LiAlCl_4 \cdot 2SO_2$ electrolytes in the corresponding ratio. Specifically, a 1:10 ratio of $NaAlCl_4$:$LiAlCl_4$ was used for the Li based cells.

Example 3

The electrolyte with the LiDFOB additive has been prepared by mixing 1 wt % of LiDFOB into the electrolytes of examples 1 and 2. Electrolytes with NaDFOB, LiTriflate, or NaTriflate additive were prepared analogously.

Preparation of the Active Material

Example 4

The alkali halide material based cathodes have been prepared by making a saturated solution of NaCl, LiCl, NaBr, LiBr, NaI, or LiI in methanol, dispersing porous carbon into the saturated solution, and evaporating the solvent. In case of NaF and LiF, propylene carbonate was used instead of methanol.

Example 5

To obtain cathode material based on alkali halide:copper formulation, copper was infused into the materials of example 4 from copper-nitrate dissolved in ethanol, according to the procedure described in [2]. The amount of the copper precursor was adjusted to obtain a 2:1 molar ratio between the alkali halide and copper.

Preparation of the Positive Electrode

Example 6

The electrode was prepared from a mixture of 94 wt % of the active materials from examples 4 and 5, and 6 wt % of PTFE. This mixture was dry-pressed onto carbon-coated aluminum current collector, according to the dry-pressing procedure of [3].

Preparation of the Rechargeable Batteries

Example 7

A rechargeable NaCl active material based battery was prepared having a Constantan anode current collector, a glass microfiber separator of 200 micron of thickness, which is soaked in $NaAlCl_4 \cdot 2SO_2$ electrolyte and, the NaCl based cathode obtained through the procedures described in Examples 4 and 6. The battery prepared for this example exhibited the average discharge voltage evolution shown in FIG. 3.

Example 8

A rechargeable 2NaCl:Cu active material formulation based battery was prepared having a metallic Na anode, a glass microfiber separator of 200 micron of thickness, which is soaked in $NaAlCl_4 \cdot 2SO_2$ electrolyte and, the 2NaCl:Cu formulation based cathode obtained through the procedures described in Examples 4, 5, and 6. The battery prepared for this example exhibited the average discharge voltage evolution shown in FIG. 4, and the details of one cycle charge-discharge voltage evolution is shown in FIG. 5.

Example 9

A rechargeable 2LiF:Cu active material formulation based battery was prepared having a metallic Li anode, a glass microfiber separator of 200 micron of thickness, which is soaked in LiAlCl$_4$·2SO$_2$ electrolyte with 1 wt % LiDFOB additive and, the 2LiF:Cu formulation based cathode obtained through the procedures described in Examples 4, 5, and 6. FIG. 6 shows one cycle charge-discharge voltage evolution of the battery prepared for this example.

REFERENCES

1. DOI: 10.1038/srep12827
2. DOI: 10.1002/adfm.201304156
3. Patent number DE 10 2012 203 019 A1

The invention claimed is:

1. An electrochemical cell comprising:
   an anode current collector, the anode current collector comprising:
      a carbon coated metal,
      an alloy of two or more metals, or
      a carbon coated alloy of two or more metals;
   an SO$_2$ solvent based electrolyte; and
   a cathode,
   wherein the anode current collector is configured such that one or more alkali metals are deposited in metallic form on the anode current collector during charging.

2. The electrochemical cell of claim 1, wherein the cathode comprises one or more partially oxidized transition metals including a mixture of a metallic form of one or more transition metals and an oxidized form of the one or more transition metals.

3. The electrochemical cell of claim 2, wherein at least one of the one or more partially oxidized transition metals is a component of a partially oxidized transition metal compound.

4. The electrochemical cell of claim 3, wherein at least one of the one or more partially oxidized transition metal compounds is of the form, M$_y$A, where M is a partially oxidized transition metal, A is an oxidizer and y is the ratio of M/A such that said transition metal is in a partially oxidized state.

5. The electrochemical cell of claim 4, wherein at least one of the one or more oxidizers, A, is oxygen, nitrogen, sulfur, antimony or cyanide or any combination thereof.

6. The electrochemical cell of claim 2, wherein at least one of the one or more partially oxidized transition metal compounds is an oxide, a sulfide, a halide, a cyanide, a nitride or any combination thereof.

7. The electrochemical cell of claim 6, wherein the cathode comprises one or more halides, and wherein at least one of the one or more halides comprise Cu$_y$Br, Cu$_y$I, Cu$_y$Cl, Cu$_y$F, where y is greater than 0.5, or any combination thereof.

8. The electrochemical cell of claim 2, wherein at least one of the one or more partially oxidized transition metal oxides comprises a combination of metallic copper and oxidized copper, wherein the combination has an overall formula Cu$_y$O where y is greater than 1.

9. The electrochemical cell of claim 2, wherein at least one of the one or more transition metals comprises Cu.

10. The electrochemical cell of claim 2, wherein the cathode comprises one or more alkali halides.

11. The electrochemical cell of claim 10, wherein the one or more alkali halides comprise NaF, NaCl, NaBr, NaI, LiF, LiBr, LiI, or any combination thereof.

12. The electrochemical cell of claim 10, wherein, at the time of assembly, the alkali halide:transition metal compound molar ratio is from 1:1 to 5:1.

13. The electrochemical cell of claim 1, wherein the SO$_2$ solvent based electrolyte comprises a halide-containing salt additive as an SEI-forming additive.

14. The electrochemical cell of claim 13, wherein the halide-containing salt additive comprises a fluorine-containing salt additive.

15. The electrochemical cell of claim 14 wherein the fluorine-containing salt additive comprises Na-DFOB (Sodium-difluoro-oxalato-borate), Li-DFOB (Lithium-difluoro-oxalato-borate), Na-Triflate (Sodium-trifluoromethane-sulfonate), or Li-Triflate (Lithium-trifluoromethane-sulfonate) or a combination thereof.

16. The electrochemical cell of claim 1, wherein the SO$_2$ solvent based electrolyte comprises a mixture of alkali metal electrolyte salts.

17. The electrochemical cell of claim 16, wherein the alkali metal electrolyte salts are lithium and sodium electrolyte salts.

18. The electrochemical cell of claim 17, wherein the alkali metal electrolyte salts comprise a mixture of LiAlCl$_4$ and NaAlCl$_4$.

19. The electrochemical cell of claim 1, further comprising:
   one or more excess non-dissolved/solid alkali halides; or
   a spacer or separator between the anode current collector and the cathode.

20. The electrochemical cell of claim 19, wherein the excess non-dissolved/solid alkali halide comprises NaF, NaCl, NaBr, NaI, LiF, LiCl, LiBr, LiI, or any mixture thereof.

21. The electrochemical cell of claim 1, wherein the anode current collector comprises a copper-nickel alloy.

22. The electrochemical cell of claim 1, further comprising an anode active material in contact with the anode current collector, wherein the anode active material comprises an alkali metal in metallic form.

23. The electrochemical cell of claim 1, wherein the anode current collector is configured such that the one or more alkali metals are deposited in a dendrite-free metallic form on the anode current collector during charging.

24. The electrochemical cell of claim 1, wherein the anode current collector comprises a carbon coated metal or a carbon coated alloy of two or more metals.

* * * * *